Feb. 20, 1951        A. A. VARELA        2,542,066
PERIODIC HIGH-VOLTAGE IMPULSE GENERATOR
Filed March 30, 1943
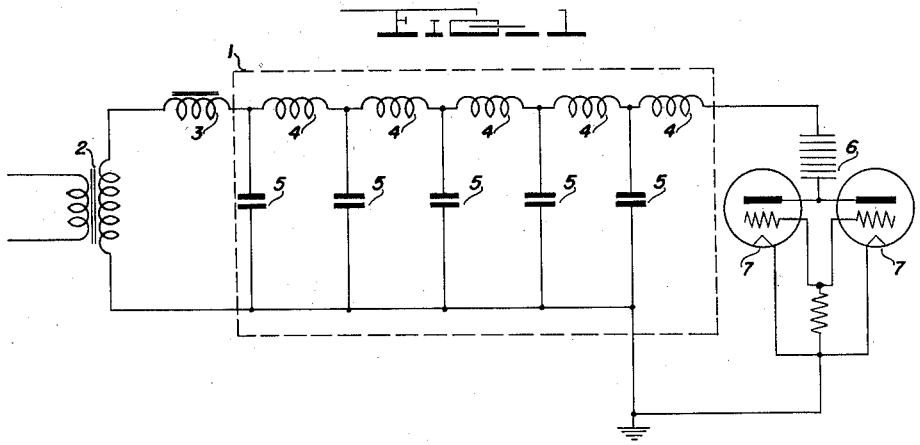
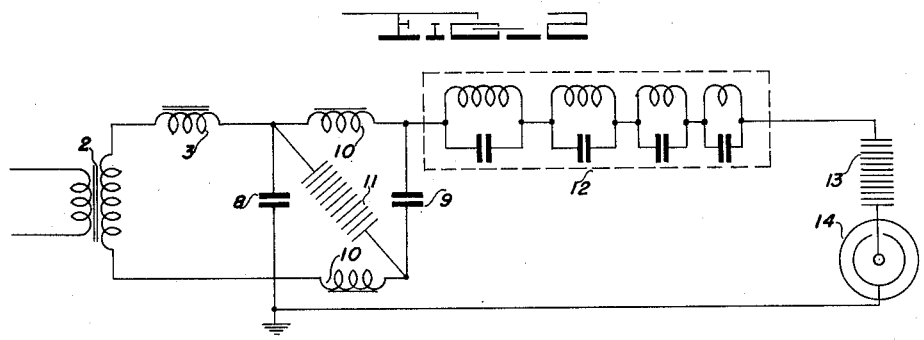
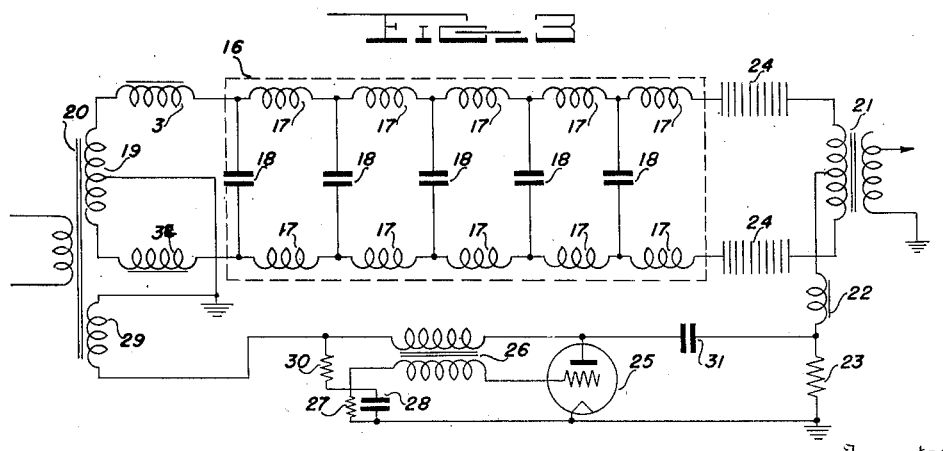
Inventor
ARTHUR A. VARELA
By
Attorney Patented Feb. 20, 1951

2,542,066

UNITED STATES PATENT OFFICE 2,542,066

PERIODIC HIGH-VOLTAGE IMPULSE
GENERATOR

Arthur A. Varela, Washington, D. C.

Application March 30, 1943, Serial No. 481,109

13 Claims. (Cl. 250—36)

(Granted under the act of March 3, 1883, as
amended April 30, 1928; 370 O. G. 757)

This invention relates to impulse generators operating through the periodic discharge of a potential storing circuit, and is particularly directed to generators of this type wherein the potential storing circuit is charged with an alternating voltage.

In impulse generators employing periodic discharge of a storing circuit, it is highly desirable to use a discharge gap in the output circuit to obtain the periodic impulse. In the operation of such a system, the impulse starts when the potential across the gap reaches the ionizing value, and is maintained until the potential has decreased sufficiently to terminate the discharge, whereupon the impulse is interrupted until such time as the storing circuit is again recharged and the requisite potential is reestablished across the discharge gap to ionize the same, whereupon the cycle is repeated. Manifestly where an alternating potential is supplied to the storage circuit, the discharge gap will break down first with one polarity and then with the opposite polarity. A discharge of this type, first in one direction and then in the opposite direction, is wholly unsuitable for many purposes.

Accordingly, it is an object of this invention to obtain periodic impulses of constant polarity from a storing circuit charged with alternating potential.

It is a further object of the invention to insure periodic breakdown in the same direction of a discharge gap connected across a storing circuit supplied with an alternating potential.

The invention will be further understood with reference to the exemplary embodiments shown in the drawings, in which:

Fig. 1 is a diagrammatic representation of a high voltage periodic impulse generator embodying the invention;

Fig. 2 is a diagrammatic representation of another high voltage periodic impulse generator embodying the invention; and Fig. 3 is a diagrammatic representation of a further high voltage periodic impulse generator embodying the invention.

In the impulse generating system, shown in Fig. 1, the storing circuit 1 is charged with an alternating potential from a power supply comprising transformer 2 and charging choke 3. The storing circuit consists of an artificial line comprising inductances 4 and capacitors 5.

The discharge circuit includes a quenched discharge gap 6 in series with unilateral impedance devices 7, which, as shown, are vacuum tubes connected as a high frequency oscillator. The discharge circuit is connected across the output of the storing circuit, as shown.

In the system illustrated in Fig. 1, high frequency oscillations will be generated during the impulse period. If it is desired to obtain maximum output from the generating system, the potential can be increased by selecting the values of the secondary of supply transformer 2, choke 3, and storing circuit 1 so that together their resonant frequency is about .7 of the supply frequency.

It is also advantageous that the characteristic impedance of the artificial line be generally matched to that of the discharge circuit, and that its discharge time be equal to the time of pulse duration.

Operation of the system disclosed in Fig. 1 is as follows. When transformer 2 is energized, an alternating potential is supplied to the storing circuit and appears across the discharge circuit. On the series of potential alternations presented in the proper conducting relation to the unilateral impedances 7, substantially the whole potential of the storing circuit appears across the discharge gap 6, causing the same to ionize and discharge the storing circuit through the load, which is here presented by the unilateral impedance itself. On the other series of potential alternations the potential supplied to the discharge circuit by the storing circuit divides across the gap and the unilateral impedance, which sufficiently limits the potential across the gap as to prevent ionization. Consequently the gap is prevented from breaking down in the opposite direction, and a periodic series of impulses of constant polarity is generated.

The impulse generator shown in Fig. 2 comprises a Marx multiplier type of storing circuit including capacitors 8 and 9, and inductances 10. Capacitors 8 and 9 are charged in parallel by an alternating supply including transformer 22 and charging choke 3. The capacitors on being charged are then discharged in series through gap 11 and a discharge circuit including pulse-shaping filter 12, gap 13 and a unilateral impedance 14 shown as a magnetron.

The pulse-shaping filter 12 comprises a series of harmonically related anti-resonant circuits tuned to the period of the pulse duration and its submultiples and operates to establish a rectangular wave impulse across the load impedance as explained in my copending application, Serial No. 447,671, filed July 19, 1942.

The operation of discharge gap 13 in series with unilateral impedance 14 across storing capacitor 9 is in all respects similar to the operation of gap 6 in Fig. 1. Upon ionization of gap 13, the potentials of both storage capacitors in series are placed across gap 11, which immediately ionizes to establish full current discharge through the load. The time constant of inductances 10 is selected to block any substantial current therethrough during the period of the pulse discharge.

In order to avoid the possibility of a discharge of undesired polarity across gap 11, it is preferable that gap 11 be adjusted to break down at a higher potential than gap 13. Consequently the polarity of the discharge is determined by the discharge circuit, and periodic impulses of constant polarity are produced on one series of alternations.

In the further embodiment shown in Fig. 3, the storing circuit 16 comprises a balanced artificial line of inductances 17 and capacitors 18. The line is charged with an alternating potential through charging chokes 3 from secondary 19 of power transformer 20. Secondary 19 is provided with a grounded center tap, so that the power supply for the line is balanced to ground.

The discharge circuit for the artificial line includes an output transformer 21 having a center tapped primary which is grounded through choke 22 and resistor 23. Each side of the line is connected to the output transformer through quenched gaps 24.

The potential delivered by the line to the discharge circuit divides equally across each gap. The gaps are adjusted to have an ionizing potential greater than the voltage imposed by the line itself, and are fired by unbalancing the output circuit. This is accomplished by injection of a voltage pulse in the output circuit across resistor 23. The impulse injected is synchronized to fire the discharge gap on one series of alternations only, so that the impulses generated are of constant polarity.

Upon injection of a voltage impulse across resistance 23, the primary center tap of output transformer 21 is unbalanced, and the potential across one gap 24 is increased and that across the other is decreased. The gap subjected to increased potential is immediately ionized. Discharge to ground is blocked by inductance 22, and the full potential across the storing circuit fires the other gap, producing the desired impulse.

In the embodiment illustrated in Fig. 3, the pulse injected in the discharge circuit is generated by a relaxation oscillator comprising triode 25, transformer 26, and grid resistor 27 and capacity 28. The oscillator is energized by secondary winding 29 of power transformer 20, and supplies pulses on the positive power alternations by self-blocked oscillation. In the conventional relaxation oscillator designed for pulse operation, on the first half-cycle of oscillation, the grid condenser receives sufficient negative charge practically to block further operation until the charge leaks off through the grid resistor. The operation of the oscillator shown is similar, with the exception that the time of pulse generation is delayed to occur substantially at the crest of the power cycle delivered to the discharge circuit by artificial line 16. This delay is effected by resistance 30 connecting the grid to the power transformer. On negative power alternations, therefore, the grid condenser receives a blocking potential which prevents oscillation until it leaks off midway of the succeeding positive power alternation to permit generation of the desired pulse to fire the discharge gap. The output of the oscillator is coupled to resistance 23 through condenser 31 for injecting the pulse into the discharge circuit.

Although several embodiments of the invention have been described and disclosed herein, it is to be expressly understood that various changes and substitutions may be made therein without departing from the spirit of the invention as well understood by those skilled in the art. Reference therefore will be had to the appended claims as a definition of the limits of the invention.

The invention described herein may be manufactured and used by or for the Government of the United States of America for governmental purposes without the payment of any royalties thereon or therefor.

I claim:

1. A radio frequency impulse generating system comprising a potential storing circuit, a source of alternating potential coupled to charge the potential storing circuit, a radio frequency generator offering a unilateral load impedance, and means for periodically discharging said circuit through said generator during only one series of alterations of the charging potential, the last-named means including the unilateral load impedance offered by the generator.

2. A radio frequency impulse generating system comprising a potential storing circuit, means for supplying an alternating potential to said circuit, a discharge gap connected with said circuit, and a unilateral electronic radio frequency generator in series with the gap operative to discharge said circuit through the gap during only one series of potential alternations.

3. In an impulse generating system, a potential storing circuit, means for supplying an alternating potential to said circuit, a discharge gap, means connecting the storage circuit to one side of the gap, and a unilateral load circuit connected with the other side of the gap operative to periodically discharge the potential storing circuit through the gap during one series of potential alternations, and being inoperative during the other series of potential alternations.

4. In an impulse generating system, a potential storing circuit, means for supplying an alternating potential to said circuit, and a periodically operative discharge circuit connected across the storage circuit including in series a discharge gap and a unilateral load impedance.

5. In an impulse generating system, an artificial line, means for supplying an alternating potential to one end of said artificial line, and a discharge circuit connected across the other end of the artificial line including in series a discharge gap and a unilateral load impedance.

6. In an impulse generating system, an artificial line, means for supplying an alternating potential to one end of said artificial line, and a discharge circuit connected across the other end of the artificial line including in series a discharge gap and a unilateral electron discharge load device.

7. In an impulse generating system, a plurality of potential storing capacitors, means for charging said capacitors in parallel with an alternating potential, discharge gap means connected between said capacitors operative to discharge the same in series, and a unilateral impedance connected in series between one of said capacitors and said gap means.

8. In an impulse generating system, a plurality of potential storing capacitors, means for charging said capacitors in parallel with an alternating potential, discharge gap means connected between said capacitors operative to discharge the same in series, and a pulse-shaping filter and a unilateral impedance connected in series with said capacitors and said gap means.

9. In an impulse generating system, a potential storing circuit, alternating potential supply means coupled to the potential storing circuit, a discharge circuit connected across the potential storing circuit including a bilateral discharge gap, and voltage supply means synchronized with the alternating potential supply means and connected with the discharge gap to supply a greater potential across the gap on one series of alternations of the alternating potential than on the other series of alternations thereof so that the gap is caused to discharge in one direction only.

10. In an impulse generating system, a potential storing circuit, alternating potential supply means coupled to the potential storing circuit, a discharge circuit connected across the potential storing circuit including a bilateral discharge gap, an auxiliary impulse generating circuit connected to the discharge gap operable to supply a firing potential thereto, and means operating the auxiliary impulse generating circuit in synchronism with the alternating potential supply means to periodically supply a firing potential to the gap during only one series of alternations of the alternating potential.

11. In an impulse generating system, a potential storing circuit, alternating potential power supply means coupled to the potential storing circuit, a discharge circuit connected with the potential storing circuit including a bilateral discharge gap, a relaxation oscillator connected with the discharge gap to periodically fire the gap, and means synchronously driving the relaxation oscillator by the power supply means to fire the gap only during one series of potential alternations of the alternating potential.

12. In an impulse generating system, a potential storing circuit, balanced alternating potential power supply means coupled to the storing circuit, a balanced discharge circuit connected across the potential storing circuit including two discharge gaps and output circuit means connected therebetween, and means controlled by the power supply means to periodically unbalance the discharge circuit during only one series of potential alternations and thereby fire one of said gaps.

13. In an impulse generating system, a potential storing circuit, balanced power supply means operative to charge said circuit with an alternating potential, a balanced discharge circuit connected across the potential storing circuit including two discharge gaps, and a relaxation oscillator synchronously driven with the power supply means periodically operative during one series of potential alternations to unbalance the discharge circuit and fire one of said gaps, and being inoperative during the other series of potential alternations.

ARTHUR A. VARELA.

REFERENCES CITED

The following references are of record in the file of this patent:

UNITED STATES PATENTS

| Number | Name | Date |
|---|---|---|
| 2,084,004 | Riccioni | June 15, 1937 |
| 2,287,543 | Vang | June 23, 1942 |
| 2,365,610 | White | Dec. 19, 1944 |
| 2,394,389 | Lord | Feb. 5, 1946 |
| 2,405,069 | Tonks | July 30, 1946 |
| 2,405,070 | Tonks et al. | July 30, 1946 |
| 2,409,038 | Hansell | Oct. 8, 1946 |
| 2,411,140 | Lindenblad | Nov. 12, 1946 |
| 2,424,999 | Ostlund et al | Aug. 5, 1947 |